United States Patent
Matthaei et al.

(10) Patent No.: US 6,858,167 B2
(45) Date of Patent: Feb. 22, 2005

(54) METHOD AND DEVICE FOR PRODUCING GRANULATES FROM INTERMEDIATE PRODUCTS OF THERMO-PLASTIC POLYESTERS AND COPOLYESTERS

(75) Inventors: André Matthaei, Kitzingen (DE); Peter Locker, Grossostheim (DE); Andreas Ecker, Nürtingen-Hardt (DE); Ralf Müller, Frankfurt (DE)

(73) Assignee: Reiter Automatic GmbH, Grossosteim (DE)

( * ) Notice: Subject to any disclaimer, the term of this patent is extended or adjusted under 35 U.S.C. 154(b) by 226 days.

(21) Appl. No.: 10/018,462

(22) PCT Filed: Feb. 12, 2001

(86) PCT No.: PCT/EP01/01530
§ 371 (c)(1),
(2), (4) Date: Apr. 25, 2002

(87) PCT Pub. No.: WO01/81450
PCT Pub. Date: Nov. 1, 2001

(65) Prior Publication Data
US 2002/0171159 A1 Nov. 21, 2002

(30) Foreign Application Priority Data
Apr. 19, 2000 (GB) .......................... 10019508

(51) Int. Cl.⁷ .............................. B29B 9/10
(52) U.S. Cl. ......................... 264/9; 264/14
(58) Field of Search ............. 264/13, 14, 9; 425/6, 10

(56) References Cited

U.S. PATENT DOCUMENTS

| | | | |
|---|---|---|---|
| 1,837,869 A | * 12/1931 | Jewett et al. | 549/247 |
| 3,274,642 A | * 9/1966 | Cramer | 425/6 |
| 3,463,842 A | * 8/1969 | Flack et al. | 264/0.5 |
| 4,076,773 A | * 2/1978 | Mahl et al. | 264/3.5 |
| 4,165,420 A | 8/1979 | Rinehart | 526/63 |
| 4,436,782 A | 3/1984 | Ho | 428/402 |
| 5,188,838 A | 2/1993 | Deleuil et al. | 424/451 |
| 5,236,466 A | * 8/1993 | Lauterbach | 23/295 R |
| 5,540,868 A | 7/1996 | Stouffer et al. | 264/13 |
| 6,074,580 A | 6/2000 | Le Thiesse et al. | 264/14 |

FOREIGN PATENT DOCUMENTS

| | | |
|---|---|---|
| DE | 24 17 366 | 10/1974 |
| DE | 198 49 485 | 5/2000 |
| EP | 712703 | 5/1996 |
| WO | WO 95/33433 | 12/1995 |

* cited by examiner

*Primary Examiner*—Mary Lynn Theisen
(74) *Attorney, Agent, or Firm*—Banner & Witcoff, Ltd.

(57) ABSTRACT

The invention relates to a process and an apparatus for forming molten drops of precursors of thermoplastic polyesters or copolyesters as molten monomer, oligomer, monomer/glycol mixture or after partial polycondensator [sic] and melting to give a molten precursor, in which the precursor formed into drops is introduced into a gaseous medium, and the gaseous medium, after entry of the precursor formed into drops into the gaseous medium, accelerates the crystallization process by holding the drop-form precursor at a temperature above 100° C. and below its melting point for a limited time until crystallization of the drop at the surface of the precursor is complete. To this end, the apparatus has a fall tower, through which the gaseous medium flows in countercurrent from bottom to top, while the drops fall in the vertical direction from top to bottom into a collecting funnel with a precrystallized surface.

13 Claims, 1 Drawing Sheet

Figure 1:
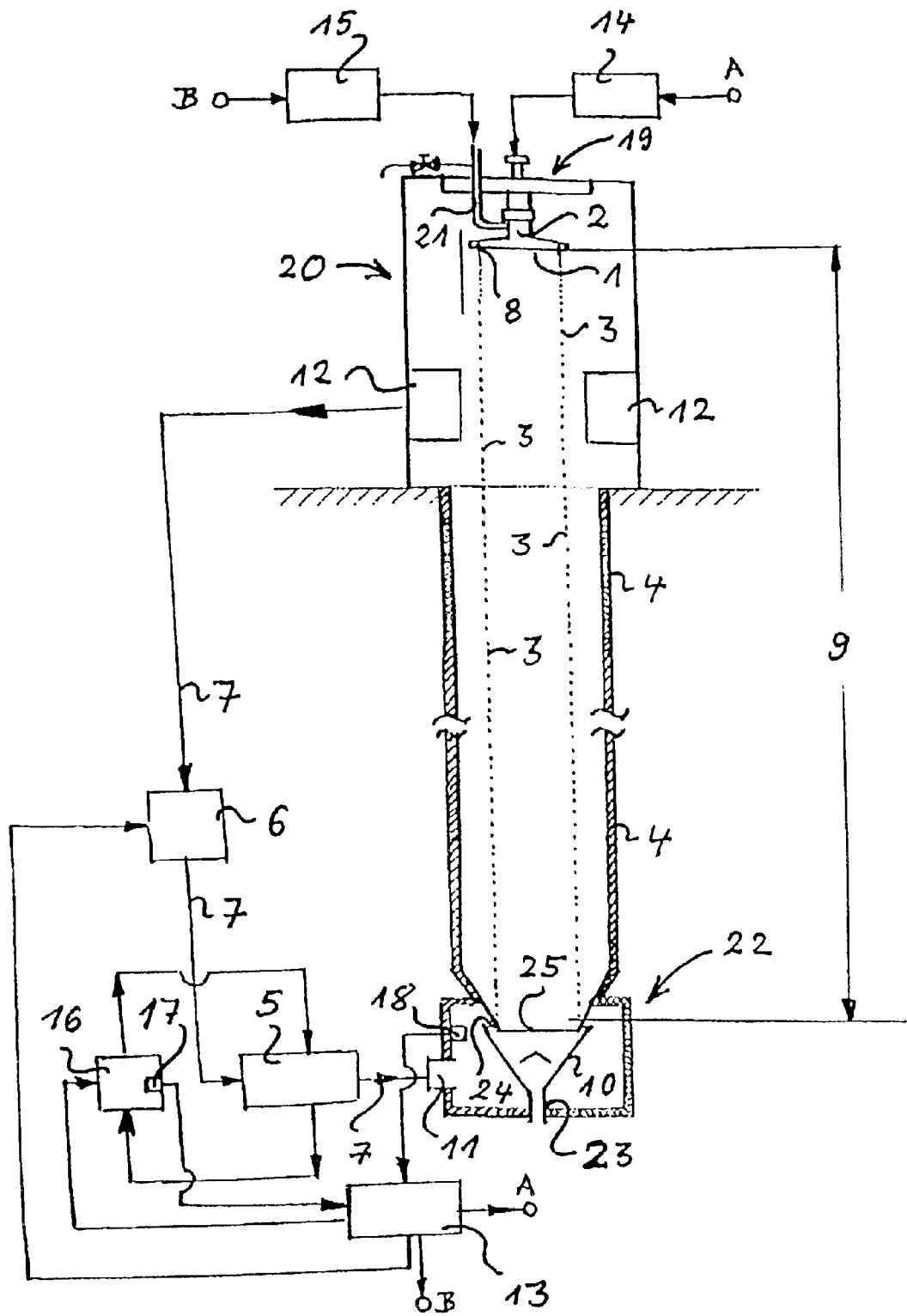

METHOD AND DEVICE FOR PRODUCING GRANULATES FROM INTERMEDIATE PRODUCTS OF THERMO-PLASTIC POLYESTERS AND COPOLYESTERS

The invention relates to a process for forming drops of precursors of thermoplastic polyesters or copolyesters as molten monomer, oligomer, monomer/glycol mixture or after partial polycondensation and melting to give a molten precursor, where the precursor formed into drops is introduced into a gaseous medium, and to an apparatus for carrying out this process.

Document U.S. Pat. No. 4,436,782 discloses a process for the granulation and further treatment of a polyethylene terephthalate (referred to as PET), in which a liquid oligomer having a viscosity number (or intrinsic viscosity) of from 0.08 to 0.15 formed at temperatures of from 260 to 280° C. is forced through nozzles so as to form drops, which fall through a cooling zone inert-gas atmosphere into a water bath in order to allow the drops to solidify to give amorphous pellets. This document also discloses that a drum or conveyor belt can be used instead of a water bath to collect the drops in order to allow them to cool and solidify to give amorphous pellets.

The process has the disadvantage that solidification of weakly polycondensed polyester, such as polyethylene terephthalate, in the liquid provided, namely water, or on the conveyor belt provided gives amorphous pellets as precursors, which then have to be converted into crystalline precursors by a further energy-consuming and expensive step. Since these precursors pass through a tacky phase on conversion into crystalline precursors and into more highly polymeric substances, the further treatment and polycondensation of the pellets can only be carried out in fluidized-bed ovens of complex design in order to prevent the pellets sticking together during crystallization and further polycondensation.

Various granulation methods for the production of crystalline pellets from amorphous polyester pellets are disclosed in U.S. Pat. No. 5,540,868. To this end, the amorphous polyester precursor must be heated to temperatures above 70° C. in order to initiate the crystallization process. However, amorphous polyester has the disadvantage that it has a tacky surface at temperatures above 70° C. In order to prevent sticking or clumping of the amorphous polyester at crystallization temperatures above 70° C., the precursor must be in the form of granules and can then be kept in motion in a fluidized-bed reactor by means of corresponding streams of hot gas until, in a multistep process, at least the surface has crystallized sufficiently that sticking of the precursors is excluded.

Whereas amorphous polyester is transparent, the crystalline phase of a precursor of a polyester or copolyester is clearly evident from the white coloration. In order to overcome the tack of amorphous polymer, the crystallization process of the precursors is usually combined with further increased polycondensation, which is usually carried out at from 200 to 230° C. in a fluidized-bed reactor. To this end, the reactor is run in such a way that firstly, in order to overcome the tack, crystallization is carried out at an optimum crystallization temperature at approximately 150° C. for a number of hours, and the pellets or granules are then condensed for further hours at temperatures of from 200 to 230° C. to give longer chain lengths.

The same above document (U.S. Pat. No. 5,540,868) discloses that the crystallization of pellets is also initiated by a thermal shock by raining hot pellets onto a cold surface or conversely raining cold amorphous pellets onto a hot surface. Shock crystallization of this type has the disadvantage that reproduction is extremely difficult since the temperatures of a hot plate vary between 300 and 800° C. as a function of the residence time of the pellets on the plate. On use of rotating plates, a temperature range of from 30 to 200° C. is used, which is again dependent on the residence time of the pellets on the hot rotating plates. Besides the purely thermal problems arising in a process of this type for the crystallization of the pellets, considerable mechanical problems also have to be overcome.

It is an object of the invention to indicate a process and an apparatus for forming drops of precursors of thermoplastic polyesters and copolyesters which overcome the disadvantages of the prior art, result in a shortening of conventional granulation processes, and are based on process steps and apparatuses known hitherto, giving at least surface-crystallized precursors formed into drops, in the form of monomers, oligomers, monomer/glycol mixtures or partially polycondensed materials.

This object is achieved by the features of the subject-matter of the independent claims. Advantageous embodiments of the invention are given in the dependent claims.

To this end, the precursor is, in accordance with the invention, introduced into a gaseous medium, where the gaseous medium, after entry of the precursor formed into drops having a diameter from 0.3 to 3 mm into the gaseous medium, accelerates the crystallization process of the precursor and brings about the crystallization state of the precursor in an accelerated manner by holding the drop-form precursor at a temperature above 100° C. and below its melting point for a limited time until crystallization of the drop at the surface of the precursor is complete.

This solution has the advantage that, through the use of this gaseous medium, the precursor formed into drops is held at a temperature above 100° C. and below its melting point for a limited time, so that crystallization nuclei in the form of defects form owing to the high surface temperature of above 100° C. and, with increasing release of the enthalpy of melting of the drop from nuclei close to the surface, cause crystallization of the surface in the limited period, so that the drop-form precursor can be collected as beads having a precrystallized and thus non-tacky surface after passing through a fall zone, without sticking and can thus be employed for immediate further treatment to give highly polymeric polycondensate. The long conventional preparation phase in a fluidized-bed reactor is thus advantageously avoided in that, as mentioned above, the amorphous state of the pellets must firstly be overcome via a tacky phase in the pellets over the course of a number of hours.

In a preferred performance of the process, the gaseous medium is air. Due to its oxygen content, the air can contribute to the formation of crystal nuclei for some types of monomers, oligomers or partially polycondensed precursors, but a low-oxygen atmosphere must be made available for many of the polycondensates and monomers thereof during drop formation, since, in particular in the case of low-viscosity PET, oxidative damage may occur during the crystallization process. In a preferred embodiment of the process, a low-oxygen atmosphere is therefore ensured, so that damage of this type does not occur.

In a further preferred performance of the process, the gaseous medium employed is an inert gas. An inert gas is necessary if precursors of polyesters or copolyesters which react particularly sensitively to various gas atmospheres are formed into drops, so that the crystallization nuclei here are only generated by the maintenance of a high temperature, namely above 100° C., through a sufficient density of holes and thermally caused defects being generated as crystallization nuclei on the surface of the drops.

As further gaseous medium, it is advantageously possible to employ nitrogen, which does not react chemically with many of the precursors to be formed into drops and thus supplies a quasi-inert environment and thus merely ensures the high temperature of the gaseous medium nitrogen for the formation of crystallization nuclei.

The gaseous medium is preferably passed in countercurrent to a fall zone of the precursor formed into drops and warms on rising of the gas along the fall zone, so that it is ensured that the precursor formed into drops retains a temperature above 100° C. for a limited period, namely while it passes through the fall zone in countercurrent to the gaseous medium. Since the melt drop itself is at a temperature of above 200° C., it warms the gas flowing in countercurrent and heats the latter up, so that the heated gas can be fed back to the fall zone in a circulation process and energy may have to be removed from the heated gas in order to avoid unnecessarily increasing the limited period for a temperature above 100° C. for the precursor formed into drops, while the gaseous medium must be heated up at the beginning of the drop-formation process in order to make it available at the correct temperature.

In order to generate the countercurrent, the gaseous medium is introduced into the fall zone of the precursor formed into drops, preferably at the lowest level of the fall zone, and is heated to temperature in advance. The heating here is preferably carried out by means of a heat exchanger which cools or heats the gaseous medium as needed, so that it can be introduced as countercurrent with a constant temperature into the fall zone of the precursor to be formed into drops.

The introduction temperature here is regulated to greater than or equal to 30° C. and less than or equal to 120° C., temperatures greater than or equal to 40° C. and less than or equal to 100° C. preferably being maintained. These low inlet temperatures in some cases ensure that the precursors formed into drops are held at a temperature of above 100° C. for a limited period while passing through the fall zone.

In a further embodiment of the invention, the precursors are formed into drops in molten form by vibration excitation. The vibration excitations here are at a frequency of from 30 to 1000 Hz, preferably from 50 to 400 Hz. A throughput of from 5000 to 30,000 kg/h can be achieved here. This throughput can be significantly increased further by distribution of nozzles over the full area of a nozzle head plate. To this end, in a preferred embodiment of the process, the precursor is fed to the nozzle head with an intrinsic viscosity in the range from 0.05 to 0.3 dl/g. For a given nozzle diameter, the drop diameter increases with increasing viscosity and decreases with increasing frequency. To this extent, the diameter of the drops can be set relatively precisely in vibration-excited drop formation via the melt temperature (adjustment of the intrinsic viscosity) and the vibration frequency.

The melting point of a PET monomer is from 230 to 240° C. and is thus lower than that of the final PET polymer. The solidification point of the precursor formed into drops can be assumed to be approximately 200° C., so that, after emergence of the drop from the nozzle and a short fall zone until the solidification point of about 200° C. is reached, initially no crystallization occurs and crystal nuclei are initially formed at the surface in the further cooling phase of the drop so long as the drops are held at above 100° C., the crystal nuclei being formed essentially from defects and holes. Crystallization of the drop surface then starts from the crystal nuclei, which ultimately ensures that the drop no longer has tacky properties at the end of the fall zone, as would be the case for amorphous pellets at above 70° C. For this crystallization phase in a gaseous countercurrent in which the drops of the precursor are held at above 100° C., a fall height of from 8 to 15 m, depending on the diameter of the drop, has proven successful. An essential parameter of the process is thus the reproducibility and uniformity of the drop diameter.

In a preferred performance of the process, the precursor is formed into drops whose diameter is more than 80% by weight in the region of twice the nozzle diameter, and a diameter less than the nozzle diameter occurs to the extent of less than 3% by weight and a diameter greater than three times the nozzle diameter occurs to the extent of less than 10% by weight of the precursor formed into drops. The advantages of uniform crystallization, uniform cooling and low achievable adhesion tendency of the drops are associated with this high uniformity of drop formation of the vibration-excited melt of a precursor of a polyester or copolyester.

This narrow bead size distribution also produces a low dust content, which, in the process according to the invention, is less than 1% by weight, with which the advantage of reduced electrostatic charging, a smaller amount of waste and a reduced risk of explosion is associated. Finally, a narrow particle-size spectrum as is possible with the process according to this invention ensures more uniform polycondensation during further processing in the solid-state polycondensation (known as SSP). A bead size diameter of from about 0.5 to 2 mm significantly accelerates the condensation of water and glycol during further treatment during the solid-state polycondensation. A bead size of from 1 to 10 mg here is a significant improvement compared with the granule sizes employed hitherto, which are essentially larger.

Finally, it is of particular advantage if the precursor employed can be a precrystallized monomer drop, since during subsequent further processing, fewer undesired intermediate products or cleavage products are formed than in conventional processing methods.

An apparatus for carrying out the drop-formation process has the following features:
a nozzle head which forms drop-form pellets from the precursor through vibration excitation of the melt,
a fall tower, in which the precursor formed into drops is heated in countercurrent with a gaseous medium,
a heat exchanger, which is arranged in a base region of the fall tower and heats or cools the gaseous medium in order to regulate it to a uniformly high inflow temperature,
a fan, which accelerates the gaseous medium in the fall tower to a prespecified flow rate, and
a return line, which returns the gaseous medium to the heat exchanger after it has left the fall tower.

This plant has firstly the advantage of relatively uniform drop formation of the molten precursor through vibration excitation, and secondly the advantage of relatively simple construction, which merely makes available a sufficient fall zone in a fall tower in order to ensure a limited residence time of the precursor formed into drops at a temperature above 100° C., the thermal energy released from the precursor formed into drops to the gas flowing in countercurrent being utilized in order to be re-used in an energy-saving manner. The length of the fall zone and the preheating or heating temperature of the gaseous medium introduced enable the residence time to be set above the critical 100° C.

in the fall zone of the fall tower. Overall, the vibration frequency of the drop-formation device, the nozzle diameter of the nozzle head, the viscosity and thus the temperature of the precursor in the nozzle head and the temperature of the gaseous medium determine the diameter and the crystallization progress of the precursor formed into drops. The degree of crystallization can be determined roughly via the milky clouding of the drop addition, so that here too, it is possible to carry out reliable spot checks of the functioning of the apparatus and the process.

In a preferred embodiment of the apparatus for performing the process, the nozzle head has nozzle apertures which ensure drop formation in the vertical direction. In contrast to a spray nozzle, the vertical drop formation produces the possibility of running the fall zone of the drops in a completely parallel manner through the fall tower of the plant without touching the walls and, after the prespecified fall zone, which corresponds to a crystallization time, of collecting the granules or the bead-form drops in a funnel in a non-sticky manner and discharging them at the base of the fall tower.

In a further preferred embodiment of the invention, the temperature of the gaseous medium is regulated to a feed temperature of greater than or equal to 30° C. and less than or equal to 100° C., preferably greater than or equal to 40° C. and less than or equal to 100° C., by means of the heat exchanger. To this end, a heat-exchange fluid flows through the heat exchanger in a separately regulated and temperature-stabilized circuit, so that the heat exchanger automatically cools the circulated gaseous medium when it exceeds the feed temperature and automatically warms or heats it when its temperature falls below the set feed temperature or the temperature of the heat-exchange fluid.

In a further preferred embodiment of the invention, a flow rate of from 0.3 to 1 m/s of the gaseous medium in the fall tower is set via a fan. The fan may be arranged in the base region in front of or behind the heat exchanger and, as a pressure fan, generate the countercurrent of the gaseous medium in the fall tower, or it can be in the form of a suction fan and be positioned after the outlet aperture for gaseous medium of the plant in the region of the drop-formation space around the nozzle head.

In a preferred embodiment of the invention, the fall zone in the fall tower has a length of from 10 to 20 m, preferably from 12 to 15 m, so that a limited time span of an optimum crystallization time of from 2.5 to 3.5 s can be maintained.

EXAMPLE 1

A monomer/glycol mixture of a polyethylene terephthalate having a viscosity number or an intrinsic viscosity of 0.2 is discharged with a temperature of approximately 260° C. through a nozzle head for drop formation and melting, the nozzle diameter here being in each case 0.75 mm, so that the emerging melt of the precursor of a polyester is formed into drops having a diameter of about 1.5 mm by vibration excitation. These essentially spherical drops pass through a fall zone of about 15 m, in which they are held at a temperature above 100° C. by means of a low-oxygen gaseous medium. During this limited fall time of about 3 s through the limited fall zone, crystallization nuclei form at the surface of the drops, and crystallize the surface in such a way that no tacky amorphous state occurs on passing through temperatures below 100° C. The granules crystallized on the surface cool to a further treatment temperature of about 70° C. in the fall zone of the fall tower from a height of about 15 m, and are collected in a funnel at the bottom of the fall zone. A DSC measurement (or dynamic scanning calorimetry) gives a surface degree of crystallization of 100% for the spherical granules formed, which have an average diameter of 1.5 mm, more than 80% of the precursor formed into drops being in the region of twice the nozzle diameter and less than 3% by weight falling below the diameter of the nozzle diameter and less than 10% by weight being above three times the nozzle diameter. With this narrow bead size distribution of less than 3% of the beads having a diameter less than the nozzle internal diameter and less than 10% of the beads having a diameter greater than three times the nozzle internal diameter, a uniform material quality is advantageously achieved through uniform cooling conditions and a uniform material quality is achieved through uniform crystallization conditions, resulting in a uniform and low adhesion tendency of the beads formed into drops. This low and narrow bead size distribution furthermore has the advantage of a uniform material quality during subsequent further processing. During polycondensation in the solid state, known as the SSP process, uniform conditions prevail, and a material is thus achieved which has a relatively homogeneous molecular weight of the polycondensation chains. In addition, this narrow bead size distribution guarantees an extremely low proportion of fine or dust material of less than 1%, so that less reject is formed and low electrostatic charging occurs in the region of the fall tower, enabling the region of the fall tower to be protected against a dust explosion.

EXAMPLE 2

During drop formation of a polyester precursor having an intrinsic viscosity of less than 0.15, the fall time may not be sufficient for surface crystallization in the fall tower of the working example, so that drops of a melt of low viscosity may remain tacky and thus block the collecting funnel. In this case, the drops are covered by fine polyester particles in the surface in the drop-formation zone in order firstly to accelerate the crystallization process through corresponding crystallization nuclei and secondly to protect the material against sticking on encountering a collection funnel after passing through the fall tower. In this working example, it is possible to protect low-viscosity precursors of polyesters and copolyesters against sticking even in the case of relatively short fall zones in the state formed into drops. The feed with fine polyester particles can, in a further preferred embodiment of the invention, be fed in countercurrent from the base region of the fall tower with the inlet aperture for gaseous medium, and the polyester particles can, if they are not necessary for coating the drops, be discharged from the plant via the outlet aperture for gaseous medium, so that it is ensured that an explosive dust mixture does not accumulate in the fall tower.

The invention is now explained in greater detail with reference to FIG. 1.

FIG. 1 shows an apparatus for carrying out a process for forming drops of precursors of thermoplastic polyesters or copolyesters. To this end, the apparatus has a nozzle head 1, which, through vibration excitation of the melt 2 by a vibration generator 14, forms drop-form pellets 3 of the precursor. The precursor is fed to the nozzle head 1 as a melt 2 of a monomer, an oligomer, a monomer/glycol mixture or a partially polycondensed precursor via the melt device 15. The drop-formation unit 19, which is installed in the uppermost region of the plant, which is referred to below as the head region 20, is, with these auxiliary devices, capable of feeding a low-viscosity melt to the nozzle head 1 via the melt line 21 and forming drops vertically via the nozzle apertures 8 facing perpendicularly downward.

In addition, the apparatus has a fall tower 4, which is installed below the head region and has a length of from 10 to 20 m and thus provides a fall zone 9 for the spherical drops, which is essentially composed of the height of the fall tower 4 and a fall distance in the head region 20 in the embodiment according to FIG. 1. In the foot region 22 of the fall tower 4 is located a filling region 23, in which the spherical drops crystallized at the surface on passing through the fall zone 9 are collected by a collecting funnel and can be portioned in the filling region or fed on for further processing.

In the foot region 22 of the fall tower 4 is arranged an inlet aperture 11 for a gaseous medium, which is arranged via an annular aperture 24 between the fall tower end 25 and collecting funnel 10 and which is fed to the inlet aperture by the fan 6 via the heat exchanger 5 and the return line 7. The annular aperture 24 at the fall tower end 25 ensures a uniform countercurrent of the gaseous medium from the foot region 22 of the fall tower 4 to the outlet apertures 12 for the gaseous medium in the head region 20 of the apparatus. A return line 7 to the inlet aperture 11 is arranged downstream of the inlet apertures 12, so that the gaseous medium can be circulated.

The gaseous medium is matched in its composition to the material of the precursor formed into drops and can depending on the sensitivity to oxygen, be air, low-oxygen air, essentially nitrogen or an inert gas, which rises at a rate of from 0.3 to 1 m/s in the opposite direction to the fall direction of the drops in the fall tower. In a working example, the flow rate of the gaseous medium is 0.6 m/s. In this plant, the gaseous medium is, if necessary, preheated with the aid of a heat exchanger 5 to a constant temperature, which is recorded in the foot region 22 of the fall tower 4 by means of a sensor 18 for the inlet temperature of the gaseous medium. The value recorded is fed to a control unit 13, which holds a fluid for the heat exchanger in a heating and cooling device at a pre-specified temperature, which is monitored via a temperature sensor 17 for the heat-exchange fluid, so that the control unit 13 is able to regulate the temperature of the heat-exchange fluid with the aid of the heating and cooling device 16. The control unit 13 may furthermore act on the vibration generator 14 via the connection point A and change the vibration frequency, which can be set in the range from 30 Hz to 1 kHz. The control unit 13 can furthermore act on the melting device 15 via the connection point B by firstly controlling the viscosity of the melt through the melting temperature of the melting device 15 and secondly the mass flow can be influenced via a corresponding pressure supply in the melting device 15.

With the control of the pressure and temperature of the melt, it is possible simultaneously to change the diameter of the drops, which ideally corresponds to the extent of about 80% by weight to twice the diameter of the nozzle apertures 8 and only to the extent of 3% below the diameter of the nozzle aperture 8, and corresponds to the extent of less than 10% by weight to three times the diameter of the nozzle aperture 8. An optimum diameter size has proven optimum for 1.5 mm both for the generation of pre-crystallized drops of the precursor, i.e. crystallized on the surfaces, and for the further processing of the precursor to give long-chain polyesters and copolyesters.

The control unit 13 is in this embodiment microprocessor-controlled and is suitable both for regulating the inlet temperature of the gaseous medium and also for controlling the throughput of the gaseous medium and the throughput of the drop-form precursor of a polyester and/or copolyester. It is ensured here that the melt drops of the melt heated to a temperature of from 240 to 290° C. emerging from the nozzle head in the dropzone 9 are cooled to a solidification temperature of around 200° C. in the head region 20 of the apparatus and are held at a temperature above 100° C. for a period of from 2.5 to 3.5 s by the temperature-controlled gaseous countercurrent, so that seed crystals form at the surface of the drops on solidification, which pack together to form a crystallization layer close to the surface until the drops having a temperature of below 100° C. in the foot region 22 of the fall tower are collected by the collection funnel 10 and transported away. In order to improve the energy balance of the apparatus, the fall tower 4 and the foot region of the fall tower 4 have a thermally insulated design, and the gaseous medium is circulated for partial recovery of the enthalpy of melting.

| List of reference numerals | |
|---|---|
| 1 | Nozzle head |
| 2 | Melt |
| 3 | Pellets |
| 4 | Fall tower |
| 5 | Heat exchanger |
| 6 | Fan |
| 7 | Return line |
| 8 | Nozzle aperture |
| 9 | Fall zone |
| 10 | Collecting funnel |
| 11 | Inlet aperture for gaseous medium |
| 12 | Outlet aperture for gaseous medium |
| 13 | Control unit |
| 14 | Vibration generator |
| 15 | Melting device |
| 16 | Heating and cooling device |
| 17 | Temperature sensor for heat-exchange fluid |
| 18 | Temperature sensor for inflow temperature of the gaseous medium |
| 19 | Drop-formation unit |
| 20 | Head region |
| 21 | Melt line |
| 22 | Foot region |
| 23 | Filling region |
| 24 | Annular aperture |
| 25 | Fall tower end |

What is claimed is:

1. A method for forming drops of preproducts of thermoplastic polyesters or copolyesters like molten monomer, oligomer, monomer-glycol-mixture or of a molten preproduct after a partially polycondensation and a melting of the same, comprising the step of introducing drops of said preproduct into a gaseous medium, wherein said gaseous medium accelerates the crystallization procedure of said drops of said preproduct having drops of a diameter from 0.3 to 3 mm after said drops of preproduct are introduced and wherein said gaseous medium carries out acceleratively a crystallization status of said preproduct by maintaining said drops of said preproduct above a temperature of 100° C. and below its melting point for a limited period of time until a crystallization of said drops is finished on their surface.

2. The method according to claim 1, wherein air is used as said gaseous medium.

3. The method according to claim 1, wherein an atmosphere poor of oxygen is used as a said gaseous medium.

4. The method according to claim 1, wherein inert gas is used as said gaseous medium.

5. The method according to claim 1, wherein nitrogen is used as said gaseous medium.

6. The method according to any one of the previous claims, wherein said gaseous medium is directed in a counterflow of a drop section of said drops of the preproduct.

7. The method according to claim 6, wherein said gaseous medium is tempered with said drop section of said drops of said preproduct and introduced at the lowest point of said drop section.

8. The method according to claim 7, wherein the tempering of said gaseous medium is performed by heat exchanger and that said gaseous medium is conducted in a recycled process.

9. The method according to claim 1, wherein said molten preproduct is formed to drops by a vibrational stimulation.

10. The method according to claim 1, wherein said preproduct is formed to drops having an intrinsic viscosity in the range between 0.05 to 0.3 cm$^3$/g.

11. The method according to claim 1, wherein said preproduct is formed to drops which a diameter is in the range of the double of a nozzle diameter for more than 80 weight-% and which diameter is below the diameter of said nozzle for less than 3 weight-% and which diameter is larger than three times said nozzle diameter for less than 10 weight-% of the drops of said preproduct.

12. The method according to claim 1, wherein a dust particle ratio is present during formation of drops which is less than 1 weight-% of said drops of said preproduct.

13. The method according to claim 1, characterized in that a low viscosity preproduct having an intrinsic viscosity lower than 0.15 is formed to drops in an environment enclosing fine polyester particles, so that a coating of said drops at their surface takes place with said polyester particles which enhance the crystallization and avoid an adhesion of the solidified drops.

* * * * *

UNITED STATES PATENT AND TRADEMARK OFFICE
CERTIFICATE OF CORRECTION

PATENT NO. : 6,858,167 B2  
APPLICATION NO. : 10/018462  
DATED : February 22, 2005  
INVENTOR(S) : André Matthaei et al.

It is certified that error appears in the above-identified patent and that said Letters Patent is hereby corrected as shown below:

On the title page, Assignee item (73):
    Please replace "Reiter" with --Rieter--

Signed and Sealed this

Fifth Day of December, 2006

JON W. DUDAS  
*Director of the United States Patent and Trademark Office*